(12) United States Patent
Mino

(10) Patent No.: US 6,188,544 B1
(45) Date of Patent: Feb. 13, 2001

(54) THIN-FILM MAGNETIC HEAD WITH THREE-LAYER POLE TOP STRUCTURE

(75) Inventor: Tetsuya Mino, Chiba (JP)

(73) Assignee: TDK Corporation, Tokyo (JP)

( * ) Notice: Under 35 U.S.C. 154(b), the term of this patent shall be extended for 0 days.

(21) Appl. No.: 09/150,206

(22) Filed: Sep. 9, 1998

(30) Foreign Application Priority Data

Oct. 15, 1997 (JP) .................................................. 9-296461

(51) Int. Cl.$^7$ .............................. G11B 5/147; G11B 5/127
(52) U.S. Cl. ............................................ 360/126; 360/317
(58) Field of Search .................................. 360/125, 126, 360/119, 317

(56) References Cited

U.S. PATENT DOCUMENTS 5,673,163 * 9/1997 Cohen ................................... 360/126
5,938,941 * 8/1999 Ishiwata et al. ........................ 216/22

* cited by examiner

*Primary Examiner*—George J. Letscher
(74) *Attorney, Agent, or Firm*—Arent Fox Kintner Plotkin & Kahn, PLLC

(57) ABSTRACT

A thin-film magnetic head includes an ABS and a three-layer pole tip structure located between the ABS and a position at a predetermined height from the ABS. The structure consists of a first pole, a recording gap layer and a second pole. The recording gap layer is made of a material having a etching rate equal to or higher than that of a material for making the first and second poles.

6 Claims, 5 Drawing Sheets

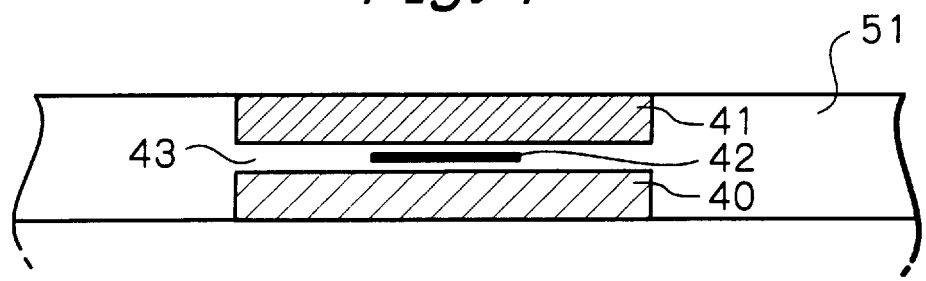
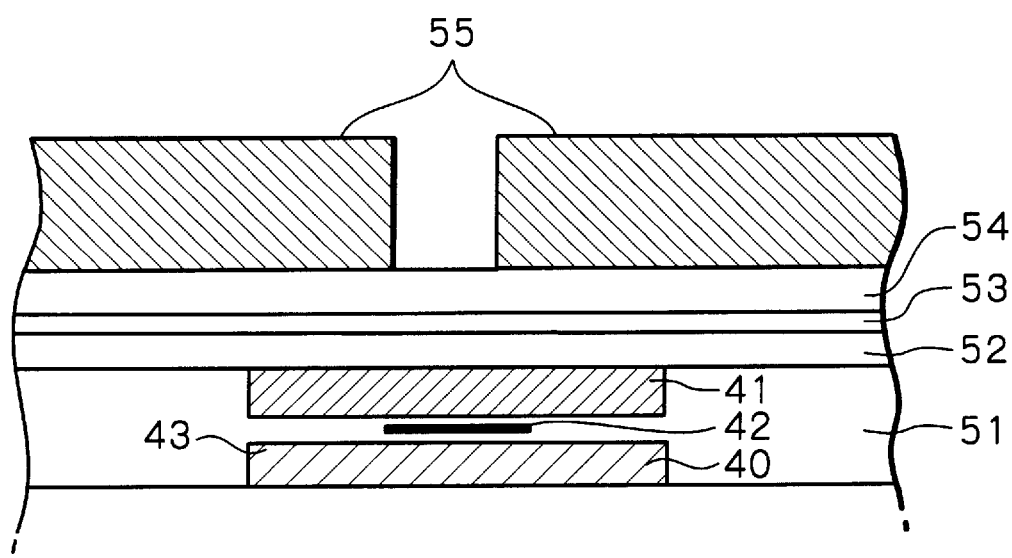
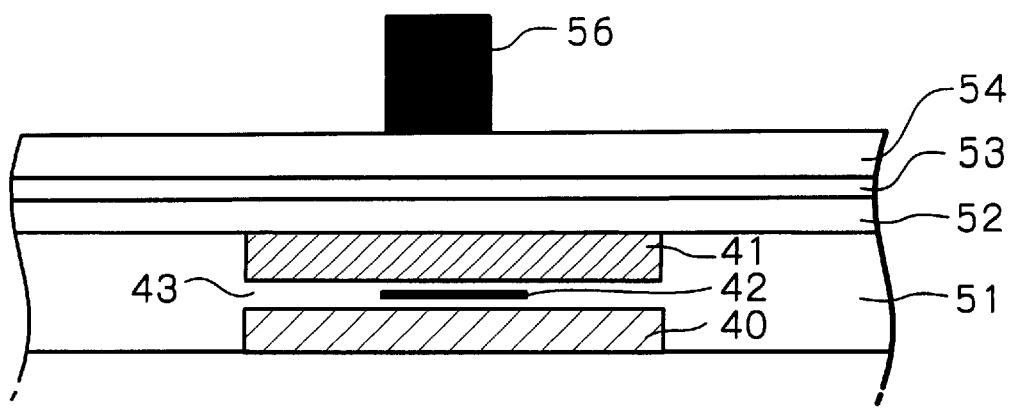

THIN-FILM MAGNETIC HEAD WITH THREE-LAYER POLE TOP STRUCTURE

FIELD OF THE INVENTION

The present invention relates to a thin-film magnetic head provided with at least an inductive recording transducer element and to a method of manufacturing the head.

DESCRIPTION OF THE RELATED ART

FIG. 1 is a cross-sectional view perpendicular to the plane of the air bearing surface (ABS), illustrating an example of a conventional composite type thin-film magnetic head with an inductive recording head part and a magnetoresistive (MR) reproducing head part.

In the figure, the reference numeral 10 denotes a lower shield layer of the MR reproducing head part, 11 denotes an upper shield layer of the MR head part, which also acts as a lower pole of an inductive recording head part, 12 denotes a MR layer provided through an insulating layer 13 between the lower shield layer 10 and the upper shield layer 11, 14 denotes a recording gap layer of the recording head part, 15 denotes an upper pole, 16 denotes a lower insulating layer deposited on the recording gap layer 14, 18 denotes a coil conductor formed on the lower insulating layer 16, and 17 denote an upper insulating layer deposited so as to cover the coil conductor 18. The upper pole 15 is magnetically connected with the lower pole (upper shield layer) 11 at its rear portion so as to constitute a magnetic yoke together with the lower pole 11.

As apparent from the figure, since the recording gap layer 14 of the conventional thin-film magnetic head is formed even under the coil conductor for generating a recording magnetic field, it is necessary to use materials having a high thermal conductivity. Thus, as the material of the recording gap layer 14, aluminum oxide ($Al_2O_3$) with comparatively high thermal conductivity has typically been used.

Recently, demand for higher recording density has made a recording track width narrower, and therefore a submicron width of the pole of the recording head part has been needed. To cope with such narrower pole width, a thin-film magnetic head is formed in a manner that only the recording pole portion is separated from other portions. That is, a three-layer pole structure with a lower pole tip element, a recording gap layer and an upper pole tip element is formed at only a pole tip region located between the ABS and a position at a predetermined height from the ABS in the recording head part, and an upper yoke and a lower yoke are magnetically connected to the top surface and the bottom surface of this pole tip structure, respectively.

FIGS. 2 and 3 illustrate an example of a conventional composite type thin-film magnetic head having such a three-layer pole tip structure. FIG. 2 is a cross-sectional view perpendicular to the plane of the ABS, and FIG. 3 is a schematic ABS view. In these figures, the reference numeral 20 denotes a lower shield layer of the MR reproducing head part, 21 denotes an upper shield layer of the MR head part, which also acts as a lower auxiliary pole of an inductive recording head part, 22 denotes a MR layer provided through an insulating layer 23 between the lower shield layer 20 and the upper shield layer 21, 24 denotes a lower pole tip element of the inductive recording head part, 25 denotes an upper pole tip element, 26 denotes a recording gap layer formed between the lower pole tip element 24 and the upper pole tip element 25, 27 denotes a lower insulating layer deposited on the upper shield layer 21 and around a three-layer pole structure consisting of the lower pole tip element 24, the recording gap layer 26 and the upper pole tip element 25, 28 denotes a coil conductor formed on the lower insulating layer 27, 29 denotes an upper insulating layer deposited so as to cover the coil conductor 28, and 30 denotes an upper auxiliary pole formed on the upper insulating layer 29 and deposited to contact with the upper pole tip element 25. The upper auxiliary pole 30 is magnetically connected with the lower auxiliary pole (upper shield layer) 21 at its rear portion so as to constitute a magnetic yoke together with the lower auxiliary pole 21.

In manufacturing the above-mentioned thin-film magnetic head in which only the recording pole portion is separated from other portions, when three-layer pole structure consisting of the lower pole tip element 24, the recording gap layer 26 and the upper pole tip element 25 is formed by a dry etching process such as ion milling, conventional use of $Al_2O_3$ as a material of the recording gap layer causes its shape control to become difficult. That is, since $Al_2O_3$ has a lower etching rate than that of magnetic materials used for the lower and upper pole tip elements 24 and 25 of the three-layer pole structure, shape control, such as formation of the side surface of the three-layer pole structure to make perpendicular to the top surface of the upper shield layer 21 is very difficult. In other words, when the three-layer pole structure is patterned by a dry etching process, the side surface of the $Al_2O_3$ gap layer 26 is not easily etched due to the lower etching rate of $Al_2O_3$ than that of the magnetic material of the upper pole 25. Thus, the side surfaces of the patterned recording gap layer 26 incline with respect to that of the upper pole layer as shown in FIG. 3. In addition, the side surfaces of the lower pole layer 24 below the recording gap layer 26 also incline as well as the recording gap layer 26, thereby generating problems such as increase of recording track width and side fringing.

In order to enhance the etching rate of $Al_2O_3$, use of a reactive ion etching (RIE) may be considered. However, when the three-layer pole structure mentioned above is etched, not only etching gas must be changed for every layer, but also an etching device should be formed so as to correspond to the etching gas for $Al_2O_3$ such as chlorine series. Additionally, a countermeasure for corrosion should be also considered.

SUMMARY OF THE INVENTION

It is therefore an object of the present invention to provide a thin-film magnetic head and a method of manufacturing the same, whereby a little side fringing and stable recording properties can be realized even in a narrower track.

According to the present invention, a thin-film magnetic head includes an ABS and a three-layer pole tip structure located between the ABS and a position at a predetermined height from the ABS. The structure consists of a first pole, a recording gap layer and a second pole. The recording gap layer is made of a material having a etching rate equal to or higher than that of a material for making the first and second poles.

According to the present invention, furthermore, a thin-film magnetic head has a MR reproducing head part, an inductive recording head part multilayered with the reproducing head part, and an ABS. The recording head part includes a three-layer pole tip structure located between the ABS and a position at a predetermined height from the ABS. The structure consists of a first pole, a recording gap layer and a second pole. The recording gap layer is made of a material having a etching rate equal to or higher than that of a material for making the first and second poles.

Also, according to the present invention, a method of manufacturing a thin-film magnetic head includes a step of sequentially depositing a first magnetic layer, a non-magnetic layer and a second magnetic layer, and a step of forming a three-layer pole tip structure located between an ABS and a position at a predetermined height from the ABS by dry etching the first magnetic layer, the non-magnetic layer and the second magnetic layer. The non-magnetic layer is made of a material having an etching rate equal to or higher than that of a material for making the first and second magnetic layers.

The first and second pole tip elements may correspond to a lower pole tip element and an upper pole tip element, respectively, or correspond to an upper pole tip element and a lower pole tip element respectively, depending upon the layered order of each layer in the manufacturing processes of the thin-film magnetic head.

Since the recording gap layer of the conventional thin-film magnetic head is extended to an area below the coil conductor for producing recording magnetic field, it is necessary to use materials having high thermal conductivity. However, in a pole separation type recording head in which a pole tip elements are separated from a yoke portion of the recording head part, the recording gap layer does not extend to the area below the coil. Thus, various materials can be selected for making the recording gap layer without being limited to those having high thermal conductivities.

Therefore, when a three-layer pole tip structure is formed by a dry etching process such as ion milling, a recording gap layer material having an etching rate equal to or higher than that of a magnetic material for making poles is used. As a result, the shape of the three-layer pole tip structure can be easily controlled. Thus, a thin-film magnetic head can be provided by a method of easily controlling the shape of the pole tip structure without selecting the dry etching process such as ion milling, while maintaining the thermal conduction level in the coil to a conventional level.

It is preferred that the material for making the recording gap layer is one selected from a group of $SiO_2$, $Ta_2O_5$, SiC, and AlN.

It is also preferred that the material for making the first and second poles is nitride containing Fe.

It is further preferred that the material for making the recording gap layer is $Ta_2O_5$, and that the material for making the first and second poles is NiFe.

Further objects and advantages of the present invention will be apparent from the following description of the preferred embodiments of the invention as illustrated in the accompanying drawings.

BRIEF DESCRIPTION OF THE DRAWINGS

FIGS. 6 to 12 are schematic illustrations of a sequence of processes in the manufacturing method of the thin-film magnetic head according to the present invention.

DESCRIPTION OF THE PREFERRED EMBODIMENTS

Figure 4:
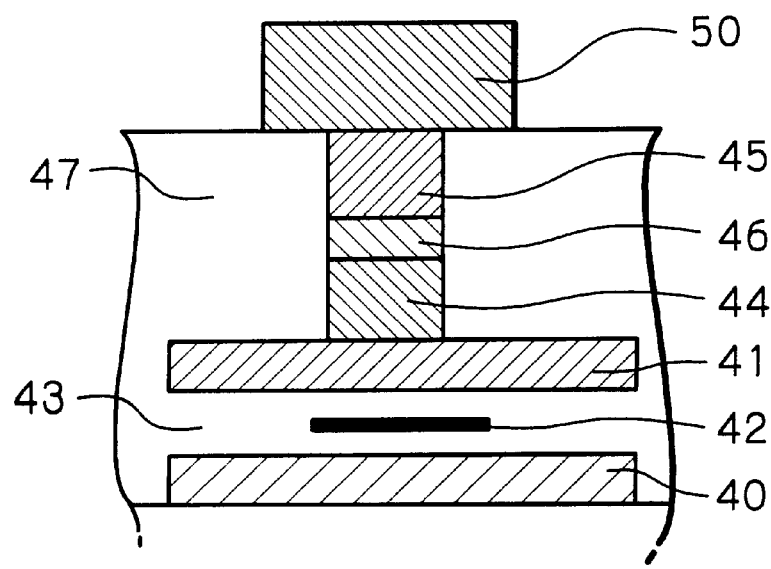
FIG. 4 is a schematic ABS view of a preferred embodiment of a composite type thin-film magnetic head having an inductive recording head part and a MR reproducing head part according to the present invention.
Figure 5:
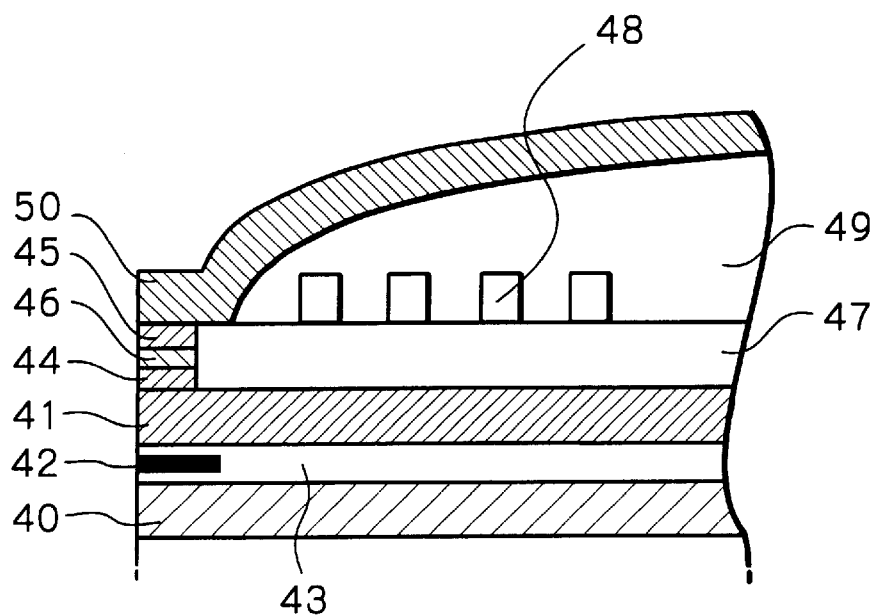
FIG. 5 is a cross-sectional view of the magnetic head of FIG. 4, perpendicular to the plane of the ABS.

FIGS. 4 and 5 illustrate a preferred embodiment of a composite type thin-film magnetic head having an inductive recording head part and a MR reproducing head part according to the present invention. FIG. 4 is a schematic ABS view, and FIG. 5 is a cross-sectional view perpendicular to the plane of the ABS.

In these figures, the reference numeral 40 denotes a lower shield layer for the MR reproducing head part, 41 denotes an upper shield layer, 42 denotes a MR layer formed between the lower shield layer 40 and the upper shield layer 41 through an insulating layer 43, 44 denotes a lower pole tip element of the inductive recording head part, 45 denotes an upper pole tip element, 46 denotes a recording gap layer formed between the lower pole tip element 44 and the upper pole tip element 45, and 47 denotes a lower insulating layer deposited on the upper shield layer 41 and around a three-layer pole structure consisting of the lower pole tip element 44, the recording gap layer 46 and the upper pole tip element 45. Furthermore, in the figures, the reference numeral 48 denotes a coil conductor formed on the lower insulating layer 47, 49 denotes an upper insulating layer deposited so as to cover the coil conductor 48, and 50 denotes an upper auxiliary pole. The upper shield layer 41 contacts to the lower pole tip element 44 to act as a lower auxiliary pole. The upper auxiliary pole 50 is magnetically connected with the lower auxiliary pole (upper shield layer) 41 at its rear portion so as to constitute a magnetic yoke together with the lower auxiliary pole 41.

The recording gap layer 46 is made of a material having an etching rate equal to or higher than that of the material of the lower and upper pole tip elements 44 and 45. In this embodiment, as the magnetic material for the lower and upper pole tip elements 44 and 45, nitride of Fe series such as FeN, FeZrN or FeBN, or a magnetic material having substantially the same etching rate as the nitride of Fe series is used. As the material of the recording gap layer 46, AlN, $Ta_2O_5$, $SiO_2$, SiC or an insulating material having substantially the same etching rate as that of the aforementioned materials. However, when NiFe having a comparatively high etching rate is used as the magnetic material for the lower and upper pole tip elements 44 and 45, it is necessary to use an insulating material such as $Ta_2O_5$ having a higher etching rate than that of NiFe for the recording gap layer 46. In stead of using an insulating material for the recording gap layer 46, a conductive non-magnetic material such as NiP can be used.

Table 1 indicates magnetic materials which can be used for the lower and upper pole tip elements 44 and 45 with their ion etching rates, and insulating materials which can be used for the recording gap layer 46 with their ion etching rates. In this Table, $Al_2O_3$ and its ion etching rate, which has been conventionally used, is indicated as a comparative example.

TABLE 1

| MATERIAL | USED FOR | ETCHING RATE (nm/min) |
| --- | --- | --- |
| NiFe | MAGNETIC POLE | 50 |
| FeZrN | MAGNETIC POLE | 27 |
| $Al_2O_3$ | RECORDING GAP | 8.5 |
| $SiO_2$ | RECORDING GAP | 33 |
| $Ta_2O_3$ | RECORDING GAP | 60 |
| SiC | RECORDING GAP | 35 |
| AlN | RECORDING GAP | 30 |

Figure 1:
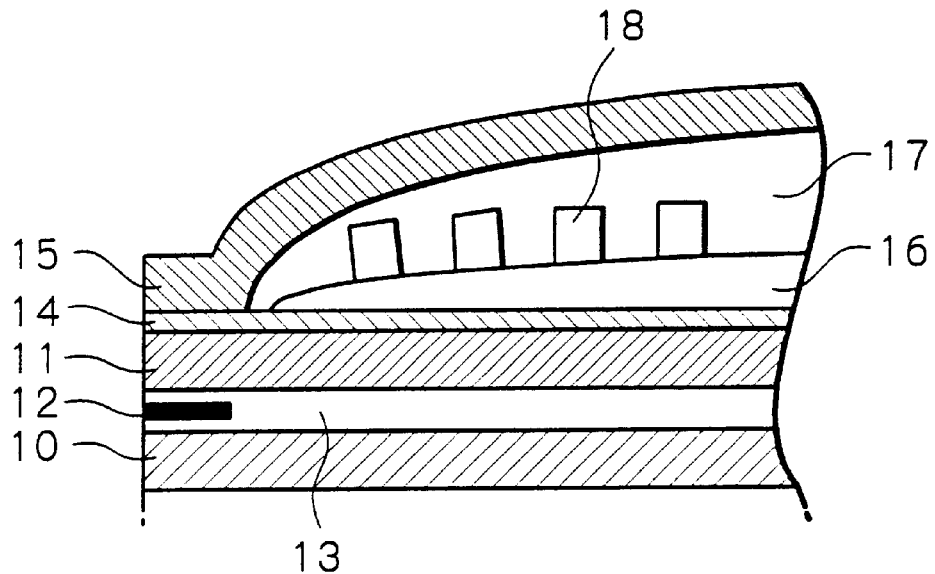
FIG. 1 is a cross-sectional view of the already described example of the conventional composite type thin-film magnetic head, perpendicular to the plane of the ABS.
Figure 2:
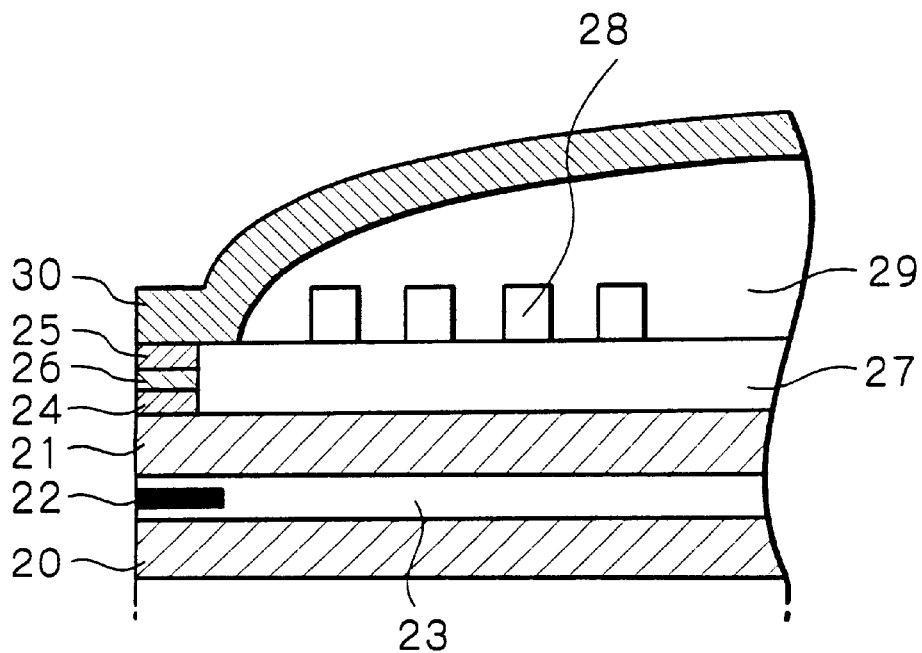
FIG. 2 is a cross-sectional view of the already described another example of the conventional composite type thin-film magnetic head having the three-layer pole structure, perpendicular to the plane of the ABS.
Figure 3:
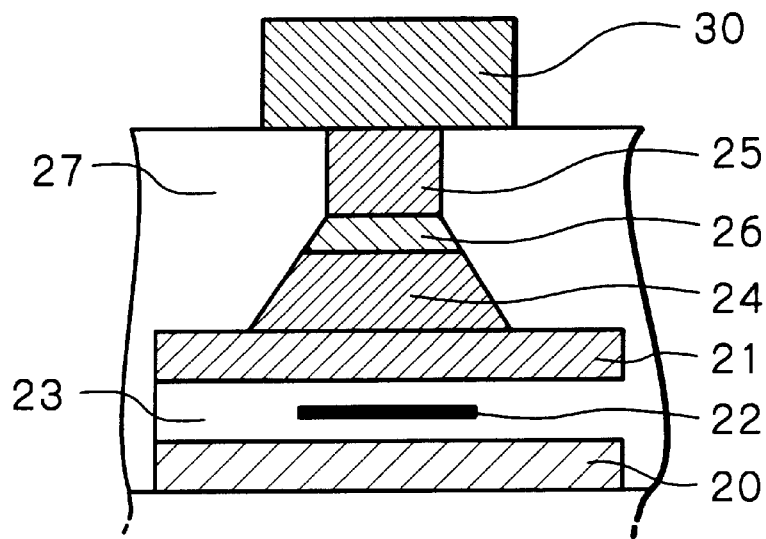
FIG. 3 is a schematic ABS view of the example shown in FIG. 2.

In the conventional head, $Al_2O_3$ is used for the gap layer of the three-layer pole structure. Thus, when the three-layer pole structure is patterned by a dry etching process such as ion milling other than RIE, the side surface of the $Al_2O_3$ gap layer is not easily etched due to the lower etching rate of $Al_2O_3$ than that of the magnetic material of the poles. Thus, the side surfaces of the patterned recording gap layer incline with respect to that of the upper pole layer as shown in FIG. 3. In addition, the side surfaces of the lower pole layer below the recording gap layer also incline as well as the recording gap layer, thereby generating problems such as increase of recording track width and side fringing.

However, according to this embodiment, since the recording gap layer 46 is made of a material having milling rate equal to or higher than that of the magnetic material for the pole layers 44 and 45, the etching can be executed as well as a single material layer is etched. Thus, the patterning control of the shape of particularly the side surface of the three-layer pole structure is facilitated, thereby preventing the occurrence of increase of the recording track width and side fringing.

It should be noted that, in the embodiment, since the recording head part is constructed as a pole separation type in which the recording gap layer 46 is not expanded into the area below the coil 48, materials other than $Al_2O_3$ can be used for the recording gap layer 46. That is, in such head, material having high thermal conductivities does not need for the recording gap layer.

FIGS. 6 to 12 are schematic ABS views illustrating processes of a method of manufacturing a thin-film magnetic head according to the present invention. The magnetic head manufactured by the following steps is a composite type thin-film magnetic head having an inductive recording head part and a MR reproducing head part.

Figure 6:
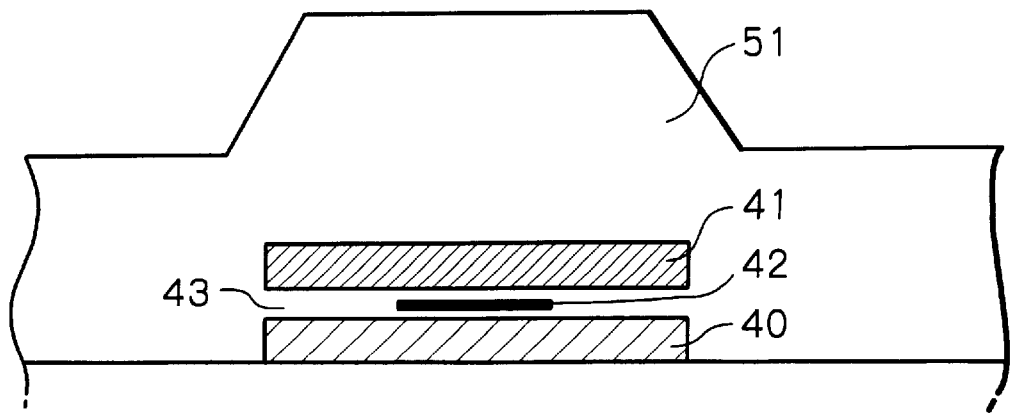

First, on a substrate (wafer) (not shown) is formed the MR reproducing head part consisting of the lower shield layer 40, the MR layer 42, the insulating layer 43, and the upper shield layer 41. As the upper shield layer 41, about 3.5 µm thick NiFe (82 wt % Ni–18 w t % Fe) is deposited and patterned by the photolithography technique, or formed by electroplating. After that, $Al_2O_3$ insulating layer 51 is deposited on the entire surface by sputtering as shown in FIG. 6. Preferably, the thickness of the insulating layer 51 is such that the top of the upper shield 41 is fully buried therein. In the this embodiment the insulating layer has a thickness of about 8.5 µm.

After that the insulating layer 51 is polished by a chemical-mechanical polishing (CMP) process to expose the top surface of the upper shield layer 41, as shown in FIG. 7. This CMP in this embodiment is carried out by using oxide abrasion grains with each diameter of about 0.02 to 0.3 µm and alkaline slurry using KOH as additives. As a polishing pad, a synthetic fiber type such as urethane is used.

After completion of the CMP, on the upper shield layer 41 and the insulating layer 51, a magnetic layer 52 for the lower pole tip element 44 of the inductive recording head part, an insulating layer for the recording gap layer 46 and a magnetic layer 54 for the upper pole tip element 45 are sequentially deposited to obtain a three-layer structure, as shown in FIG. 8.

In this embodiment, as the lower pole tip element 44, the layer 52 made of a high Bs material such as FeZrN is deposited by sputtering to have a thickness of about 0.5 µm. As the recording gap layer 46, the insulating layer 53 made of insulating material such as $SiO_2$ is deposited by sputtering to have a thickness of about 0.3 µm. As the upper pole tip element 45, the magnetic layer 54 made of a high Bs material such as FeZrN is deposited by sputtering to have a thickness of about 0.7 µm.

These three layers constituting the pole tip structure can be deposited in the same chamber. For the high Bs material layers 52 and 54 made of FeZrN, a reactive DC magnetron sputtering wherein an alloy target of 88.2 at % Fe–11.8 at % Zr is sputtered under a mixed gas of $Ar+N_2$ is executed to add nitrogen to the FeZr layer. In this case, the total pressure is 0.2 Pa, and the partial pressure of nitrogen is of 10%. Also, the applied power is 1.4 kW, and the layer formation speed is 15 nm/min. For the insulating layer 53, RF magnetron sputtering wherein a $SiO_2$ target is sputtered under Ar, $Ar+O_2$, $O_2$ gas is executed. In this case, the total pressure is 1.0 Pa, the applied power is 1.0 kW, and the layer formation speed is 4 nm/min.

Then, as shown in FIG. 8, a resist frame 55 having an opening corresponding to a portion of a mask (56 shown in FIG. 9) to be formed is formed on the magnetic layer 54 for the upper pole tip element 45. The opening has a width of about 0.3 to 2.0 µm. In this embodiment, as the resist frame 55, a novolak type resist layer having a thickness of about 2 to 5 µm is deposited and then patterned by a photolithography technique.

The mask 56 is then formed by electroless plating. It is desirable that before electroless plating, the wafer is immersed in 4.5% HCl solution for 1.5 min to obtain wetting properties of the plating surface.

The plated mask 56 is a metal compound composed of a base material of nickel (Ni) metal and cobalt (Co) metal, and additives of 3B group element such as boron (B) and 5B group element such as phosphorus (P). The thickness of the mask 56 is about 1.0 to 3.0 µm.

The resist frame 55 is then removed with acetone remover thereby obtaining a structure shown in FIG. 9.

Then, the three layers 54, 53 and 52 are etched by ion milling using the mask 56. The ion milling conditions are, for example, an accelerating voltage of 500 mV and an accelerating current of 400 mA. By this ion milling, the magnetic layer 52, insulating layer 53 and magnetic layer 54 except for an area below the mask 56 are removed to form the lower pole tip element 44, recording gap layer 46 and upper pole tip element 45.

Figure 10:
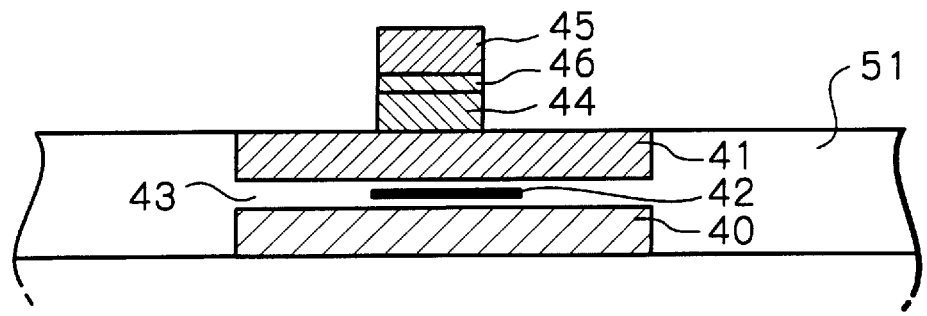

Then, the mask 56 is removed by using organic solvent such as acetone to provide a patterned three-layer pole tip structure consisting of the FeZrN lower pole tip element 44, the $SiO_2$ recording gap layer 46 and the FeZrN upper pole tip element 45, as shown in FIG. 10.

Figure 11:
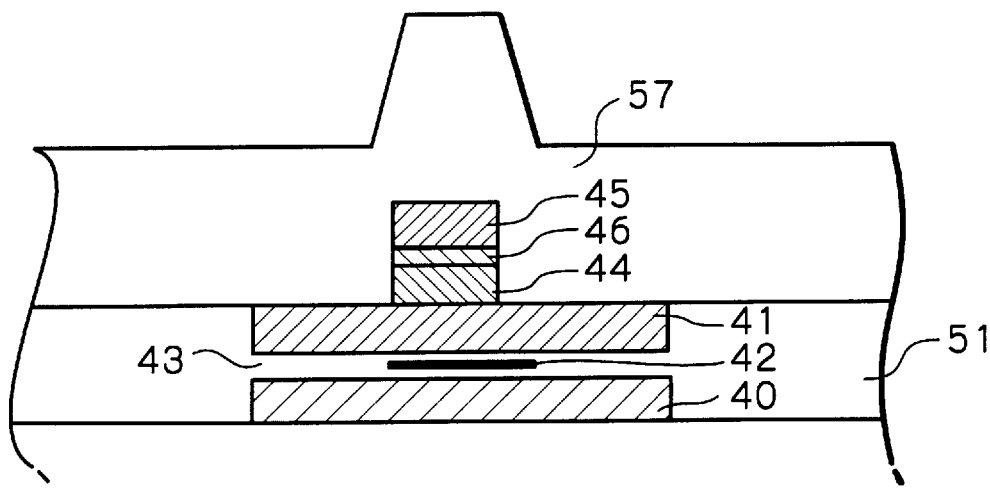

Then, as shown in FIG. 11, an insulating layer 57 consisting of an insulating material such as $Al_2O_3$ or $SiO_2$ is deposited by sputtering. The thickness of the insulating layer 57 is determined to a value such that the top of the three-layer pole structure formed by ion milling is fully buried in this layer 57, for example about 0.5 to 15 µm. In this embodiment this thickness of the insulating layer 57 is about 2.5 µm.

Figure 12:
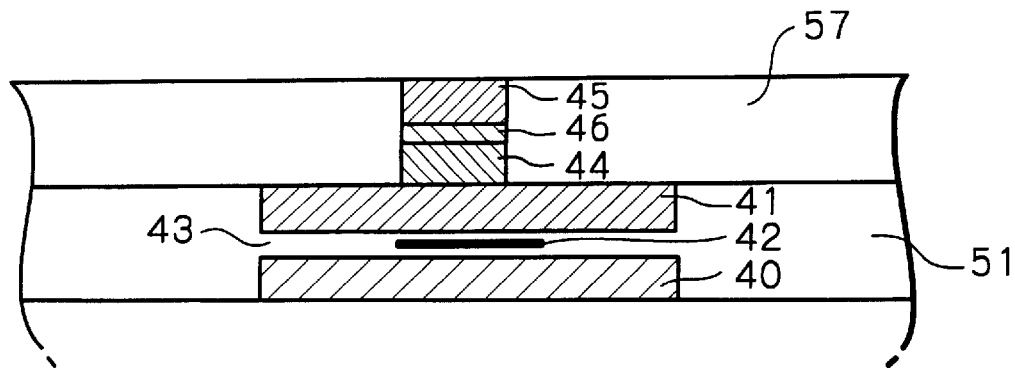

After depositing the insulating layer 57, this layer 57 is polished by a CMP process to expose the upper pole tip element 45, as shown in FIG. 12. The CMP in this embodiment is carried out using oxide abrasion grains such as $Al_2O_3$ or $SiO_2$, having each diameter of about 0.02 to 0.3 μm and alkaline slurry using KOH as additives. As a polishing pad, a synthetic fiber type such as urethane is used.

Then, on the lower insulating layer 47 is formed the coil conductor 48 on which the upper insulating layer 49 is deposited. This upper insulating layer 49 is formed by depositing a novolak type photoresist and by patterning using a photolithography technique. A resist frame is then formed by a photolithography technique and the upper auxiliary pole 50 is formed by electroplating process. The upper auxiliary pole 50 is magnetically connected to the upper shield layer 41 at the rear portion so as to form a yoke. By the above-mentioned processes, the thin-film magnetic head having the cross-sectional view of FIG. 5 can be obtained.

In stead of the mask 56, only the patterned upper pole tip element 45 is formed by plating, and then the three-layer pole structure can be formed by ion milling by using the upper pole tip element 45 as a mask.

In the above-mentioned embodiment, after forming the MR reproducing head part on the substrate, the inductive recording head part is formed. However, it is apparent that after forming the inductive recording head part on the substrate, the MR reproducing head part may be formed. In the latter case, the above-mentioned lower shield layer, the lower pole tip element, the lower auxiliary pole and the lower insulating layer will be substituted for an upper shield, an upper pole tip element, an upper auxiliary pole and an upper insulating layer, respectively.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head including an air bearing surface and a three-layer pole tip structure located between the air bearing surface and a position at a predetermined height from the air bearing surface, said structure consisting of a first pole, a recording gap layer and a second pole, said recording gap layer being made of a material having a etching rate equal to or higher than that of a material for making said first and second poles, the material for making said recording gap layer comprising $Ta_2O_5$, and the material for making said first and second poles comprising NiFe.

2. A thin-film magnetic head comprising:
a magnetoresistive reproducing head part;
an inductive recording head part multilayered with said reproducing head part; and
an air bearing surface,
said recording head part including a three-layer pole tip structure located between the air bearing surface and a position at a predetermined height from the air bearing surface, said structure consisting of a first pole, a recording gap layer and a second pole,
said recording gap layer being made of a material having an etching rate equal to or higher than that of a material for making said first and second poles, the material for making said recording gap layer comprising $Ta_2O_5$, and the material for making said first and second poles comprising NiFe.

3. A thin-film magnetic head including an air bearing surface and a three-layer pole tip structure located between the air bearing surface and a position at a predetermined height from the air bearing surface, said structure consisting of a first pole, a recording gap layer and a second pole, said recording gap layer being made of a material having an etching rate equal to or higher than that of a material for making said first and second poles, the material for making said first and second poles comprising a nitride containing Fe, and the material for making said recording gap layer comprising one selected from a group of $Ta_2O_5$, SiC, and AlN.

4. The head as claimed in claim 3, wherein the material for making said first and second poles comprises one selected from a group of FeZrN, FeBN and FeN.

5. A thin-film magnetic head comprising:
a magnetoresistive reproducing head part;
an inductive recording head part multilayered with said reproducing head part; and
an air bearing surface,
said recording head part including a three-layer pole tip structure located between the air bearing surface and a position at a predetermined height from the air bearing surface, said structure consisting of a first pole, a recording gap layer and a second pole,
said recording gap layer being made of a material having an etching rate equal to or higher than that of a material for making said first and second poles, the material for making said first and second poles comprising a nitride containing Fe, and the material for making said recording gap layer comprising one selected from a group of $Ta_2O_5$, SiC, and AlN.

6. The head as claimed in claim 5, wherein the material for making said first and second poles comprises one selected from a group of FeZrN, FeBN and FeN.

* * * * *

UNITED STATES PATENT AND TRADEMARK OFFICE
CERTIFICATE OF CORRECTION

PATENT NO. : 6,188,544 B1
DATED : February 13, 2001
INVENTOR(S) : Tetsuya Mino

It is certified that error appears in the above-identified patent and that said Letters Patent is hereby corrected as shown below:

Title page,
Item [54], change "THIN-FILM MAGNETIC HEAD WITH THREE-LAYER POLE TOP STRUCTURE" to -- THIN-FILM MAGNETIC HEAD WITH THREE-LAYER POLE TIP STRUCTURE --

Signed and Sealed this

Thirteenth Day of November, 2001

Attest:

*Nicholas P. Godici*

NICHOLAS P. GODICI
*Attesting Officer*  *Acting Director of the United States Patent and Trademark Office*